United States Patent [19]

Hattori et al.

[11] Patent Number: 5,051,082
[45] Date of Patent: Sep. 24, 1991

[54] APPARATUS FOR ADJUSTING DIE LIPS FOR EXTRUSION MOLDING

[75] Inventors: Shigeru Hattori; Susumu Tsuyuki, both of Nagoya, Japan

[73] Assignee: Mitsubishi Jukogyo Kabushiki Kaisha, Japan

[21] Appl. No.: 477,413

[22] Filed: Feb. 9, 1990

[30] Foreign Application Priority Data

Feb. 17, 1989 [JP] Japan .................. 1-36020
Jun. 23, 1989 [JP] Japan .................. 1-73680
Aug. 22, 1989 [JP] Japan .................. 1-97179
Nov. 30, 1989 [JP] Japan .................. 1-138784

[51] Int. Cl.⁵ .............................. B29C 47/16
[52] U.S. Cl. .................... 425/141; 425/466
[58] Field of Search ........... 425/141, 464, 192 R, 425/466, 376.1, 461, 140; 264/40.5, 40.1, 40.2

[56] References Cited

U.S. PATENT DOCUMENTS

| 2,765,492 | 10/1956 | Velvel | 425/466 |
| 2,938,231 | 5/1960 | Lowey | 425/466 |
| 2,975,475 | 3/1961 | Heston | 425/466 |
| 3,102,302 | 9/1963 | Moore | 425/466 |
| 3,142,090 | 7/1964 | Hoffman et al. | 425/466 |
| 3,702,751 | 11/1972 | Mehnert | 425/466 |
| 3,940,221 | 2/1976 | Nissel | 425/466 |
| 4,008,036 | 2/1977 | Verlinden et al. | 425/466 |
| 4,032,284 | 6/1977 | Vermeylen et al | 425/466 |
| 4,302,172 | 11/1981 | Hogseth et al. | 425/141 |
| 4,507,073 | 3/1985 | Shelton | 425/141 |
| 4,514,348 | 4/1985 | Iguchi et al. | 425/141 |
| 4,726,752 | 2/1988 | Van Dun | 425/141 |
| 4,854,844 | 8/1989 | Carlsen | 425/141 |

FOREIGN PATENT DOCUMENTS

| 61-40537 | 9/1986 | Japan . | |
| 62-220317 | 9/1987 | Japan . | |
| 63-30128 | 2/1988 | Japan . | |
| 63-60725 | 3/1988 | Japan . | |
| 1213455 | 11/1970 | United Kingdom | 264/176.1 |

Primary Examiner—Jay H. Woo
Assistant Examiner—William J. Matney, Jr.
Attorney, Agent, or Firm—Birch, Stewart, Kolasch & Birch

[57] ABSTRACT

An improved apparatus for controlling a plurality of die lips arranged in the direction of width of an extrusion molding die through which molten resin is extruded in the form of a sheet (or a film) so as to allow the die lips to be displaced back and forth. The apparatus includes a plurality of stud bolts fastened to the die lip with each bolt having a flange portion for holding Belleville springs which are received below the flange portion of the stud bolt. An arrangement is provided to compress the Belleville springs which includes plurality of adjustment bolts.

4 Claims, 9 Drawing Sheets

APPARATUS FOR ADJUSTING DIE LIPS FOR EXTRUSION MOLDING

FIELD OF THE INVENTION AND RELATED ART STATEMENT

The present invention relates to an apparatus for adjusting a plurality of die lips wherein the apparatus can be utilized for an unextensible film (or sheet) producing system, an extensible film (or sheet) producing system or the like.

A thermal displacement type die lip adjusting apparatus has been heretofore known to adjust a clearance of each of die lips. Specifically, the conventional apparatus is constructed such that the uppermost end of an adjustment bolt is fastened to or comes in contact with a flexible lip and a thermally displaceable unit firmly secured to a die casing via a thermal insulating material is connected to the adjustment bolt whereby the flexible lip is automatically biased in the pushing direction as well as in the pulling direction by utilizing a difference in quantity of thermal displacement between the thermally displaceable unit and the adjustment bolt during heating/cooling.

One example of the conventional apparatus for adjusting a plurality of die lips for extrusion molding will be described below with reference to FIGS. 11 and 12.

Figure 11:
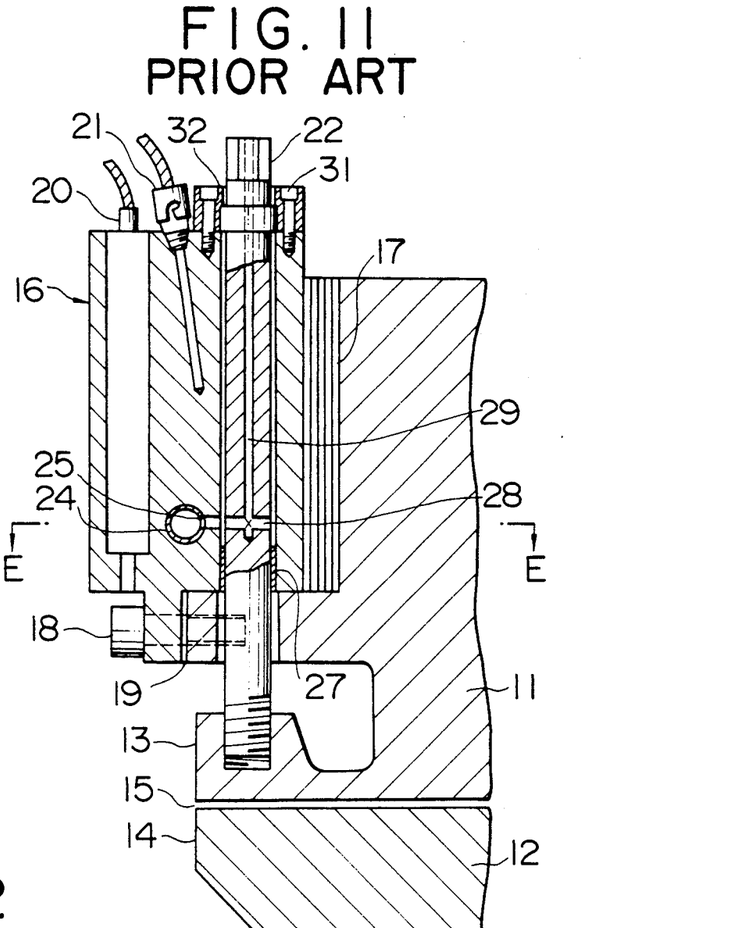
FIG. 11 is a sectional side view of a conventional apparatus for adjusting a plurality of die lips for extrusion molding.

Referring to FIG. 11, a flexible lip 13 and a stationary lip 14 are formed between a die casing 11 and a die casing 12 so that a lip clearance 15 is formed between the opposing surfaces of the both lips 13 and 14. A projection projecting from the fore end of the die casing 11 and located above the flexible lip 13 is provided with a plurality of thermally displaceable units 16 arranged in the direction of width of the lip clearance 15. One side of each thermally displaceable unit 16 is firmly secured to the die casing 11 with a thermal insulating plate 17 interposed therebetween, while the other side of the same is exposed to the outside. Incidentally, each thermally displaceable unit 16 is formed with a through hole which extends in the longitudinal direction. In FIG. 11, reference numeral 19 designates a washer for adjusting a thickness of the thermal insulating plate 17. A heater 20 and a thermocouple 21 are inserted into the thermally displaceable unit 16. A die bolt 22 threadably engaged with the upper surface of the flexible lip 13 extends through the thermally displaceable unit 16 and the die casing 11 with an annular clearance kept therebetween. A flange portion of the die bolt 22 is immovably placed on the thermally displaceable unit 16 by set screws 31 and a retainer 32.

Figure 12:
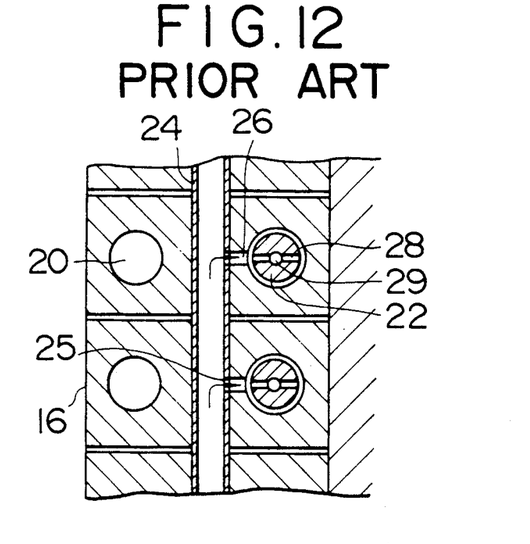
FIG. 12 is a fragmentary sectional view of the apparatus taken in line E—E in FIG. 11.

As is best seen in FIG. 12, the thermally displaceable unit 16 includes an air feed tube 24 of which one end (not shown) is connected to an air supply source and of which other end (not shown) is kept closed. The air feed tube 24 is formed with a plurality of holes 25 at positions opposite to the die bolts 22 and the holes 25 are communicated with air intake ports 26 which lead to through holes through which the die bolts extend. Each die bolt 22 is closed with a seal member 27 at its lower end, while it is closed with the retainer 32 at its upper end. Further, the die bolt 22 is formed with a lateral hole 28 at a position opposite to the air intake port 26 and a vertical hole 29 which is communicated with the lateral hole 28. As air is fed in the air feed tube 24, it flows round the outer surface of each of the die bolts 22 via the holes 25 and the air intake ports 26 and then it is discharged to the outside via the lateral holes 28 and the vertical holes 29.

With such construction, as the thermally displaceable unit 16 is heated by the heaters 20, it is thermally expanded to extend in the upward direction. At this moment, the die bolt 22 receives heat from the heater 20 but, since its outer surface and the vertical hole 29 are cooled by air, a quantity of thermal expansion of the die bolt 22 is smaller than that of the thermally displaceable unit 16. It should be added that the upper end of the die bolt 22 is firmly secured to the thermally displaceable unit 16. Consequently, the upper end of the die bolt 22 is raised up by the thermally displaceable unit 16, whereby the flexible lip 13 is flexibly displaced in the upward direction. This causes the lip clearance 15 to be widened with the result that a flow rate of molten resin is increased. At this moment, the die bolt 22 is cooled by air but it is practically heated to a slight extent so that heat in the die bolt 22 is transmitted to molten resin in the lip clearance 15 via the flexible lip 13. On the other hand, heat in the thermally displaceable unit 16 is transmitted to molten resin in the lip clearance 13 via the thermally insulating plate 17 and the die casing 11 and thereby viscosity of the molten resin is reduced. Therefore, a flow rate of the molten resin tends to increase.

When the heater 20 is turned off, the thermally displaceable unit 16 contracts and the die bolt 22 contracts too. At this moment, since the die bolt 22 is always cooled, a quantity of variation of heat (representative of a quantity of contraction of the die bolt 22) is smaller than that of the thermally displaceable unit 16 and thereby the flexible lip 13 is biased in the downward direction by the die bolt 22. Consequently, a flow rate of molten resin flowing through the lip clearance 15 is reduced. Since the die bolt 22 is not heated, the flexible lip 13 is cooled compared with the period of time when the thermally displaceable unit 16 was heated, whereby a viscosity of molten resin is increased and thereby a flow rate of the same is reduced.

Figure 13:
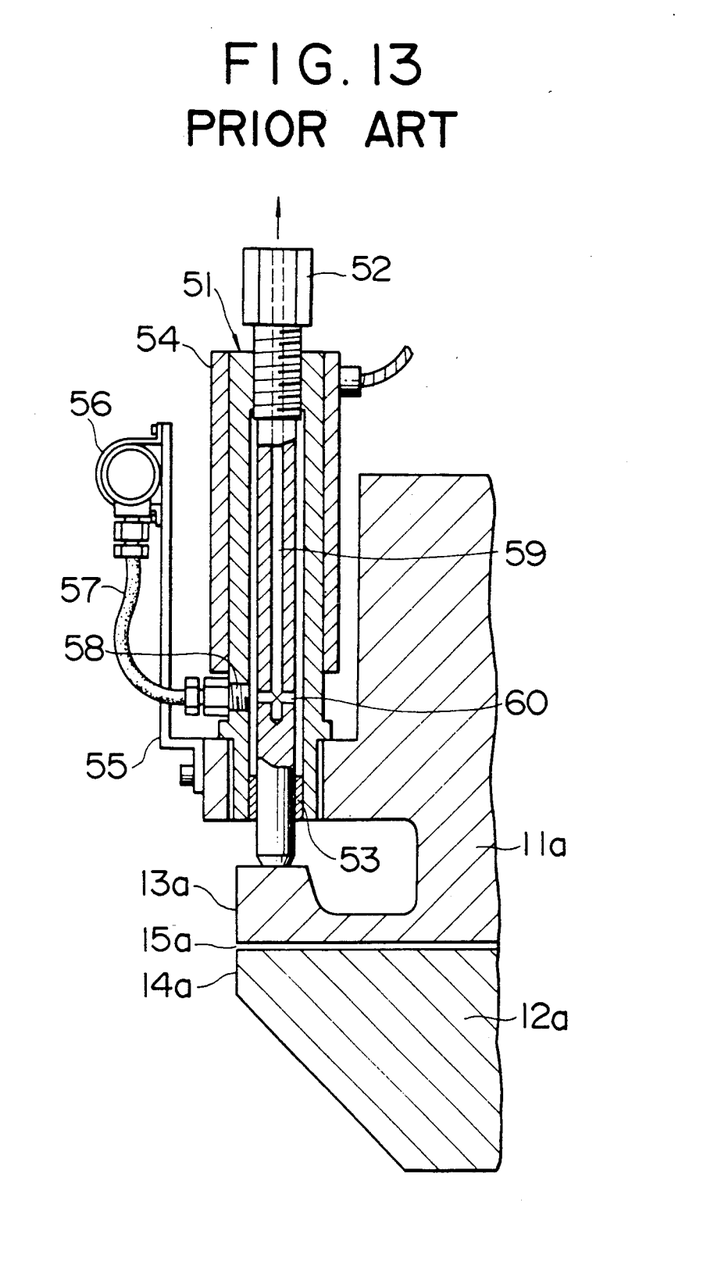
FIG. 13 is a sectional side view of other conventional apparatus for adjusting a plurality of die lips for extrusion molding.

FIG. 13 shows another example of the conventional apparatus, and reference numerals 11a to 15a designate the same components as those of the conventional apparatus shown in FIG. 11. A point of difference of the conventional apparatus in FIG. 13 from the conventional apparatus in FIG. 11 consists in that one side of each of thermally displaceable units 51 is threadably engaged with the die casing 11a and the other side of the same is kept free. In the drawing, reference numeral 52 designates a die bolt of which one end comes in contact with the upper surface of the flexible lip 13a and of which other end is threadably engaged with the free end side of the thermally displaceable unit 51. The die bolt 52 is fitted with a seal 53 at its lower end so that it is held airtight relative to the thermally displaceable unit 53. Reference numeral 54 designates a heater which is provided with a thermocouple (not shown). An air feed tube 56 secured to the die casing 11a via a bracket 55 is connected to an air intake port 58 on the thermally displaceable unit 51 via a piping 57 and the air inlet port 58 in turn is communicated with lateral holes 60 which are communicated with a vertical hole 59 in the die bolt 52.

Figure 14:
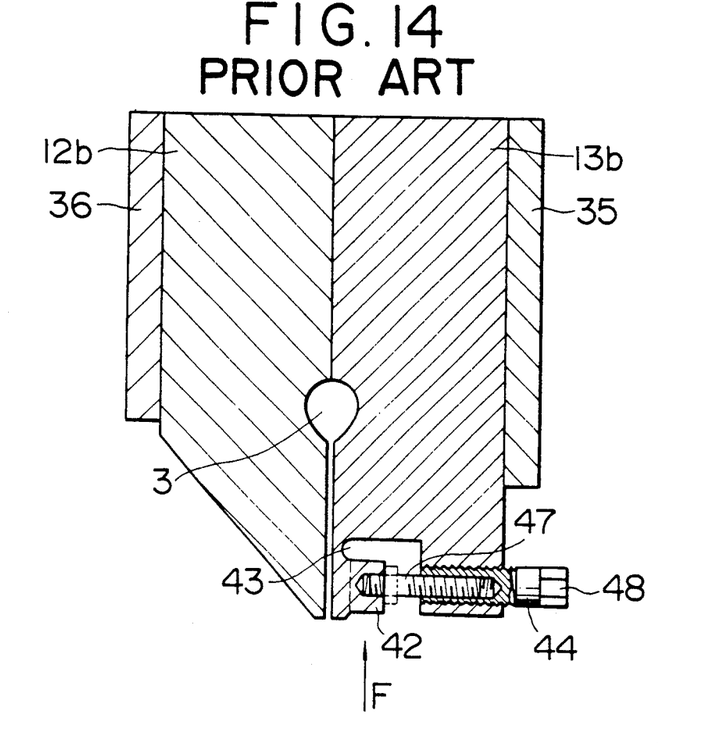
FIG. 14 is a sectional side view of another conventional apparatus for controlling a plurality of die lips for extrusion molding.
Figure 15:
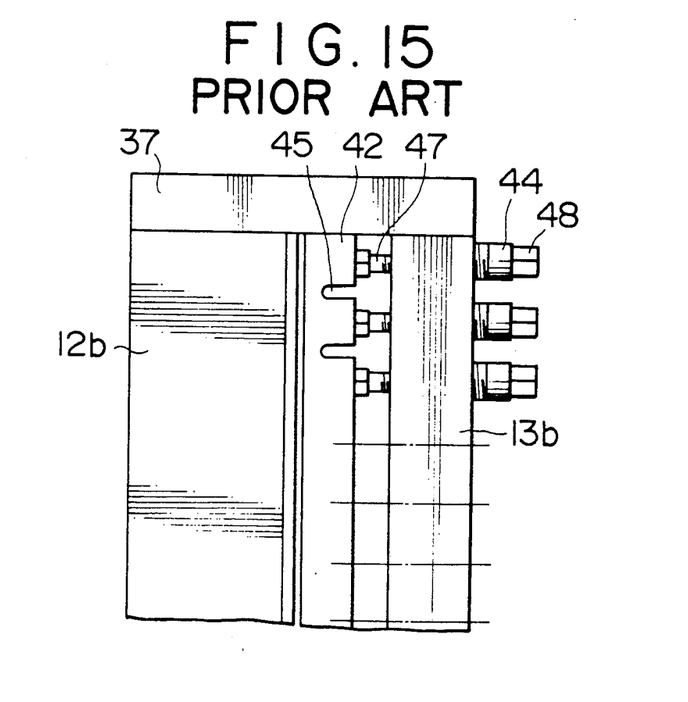
FIG. 15 is a view of the apparatus as seen in the F arrow-marked direction in FIG. 14.

Further, FIGS. 14 and 15 show another example of the conventional apparatus. FIG. 14 is a sectional side view of a flat die and FIG. 15 is a view of the flat die as seen in the F arrow-marked direction in FIG. 14. In the drawings, reference numeral 12b designates a stationary lip, reference numeral 3 designates a manifold, reference numeral 35 designates a heater for the die casing, reference numeral 36 designates a heater for the stationary lip 12b and reference numeral 13b designates a side plate. Further, reference numeral 13b designates a die casing. The die casing 13b is integrated with an adjustment lip 42 at its lower end via a cutout 43 which extends in the direction of width of the adjustment lip 42, and a lip adjustment bolt 44 is threadably fitted into the die casing 13b. The adjustment lip 42 is formed with slits 45 at two locations at each of opposite ends thereof (of which other end is not shown in FIG. 15) so that it becomes more flexible at the part including the slits 45 than the other part including no slit. This arrangement makes it possible to carry out local adjustment. It should be noted that the number of slits 45 is determined depending on a width of the adjustment lip 42 which is largely affected by neck-in.

The lip adjustment bolt 44 is threadably fitted onto a lip bolt 47 (of which washer for preventing the lip bolt 47 from being loosened is not shown in the drawings). The lip bolt 47 is threadably engaged with the adjustment lip 42 and the lip adjustment bolt 47 includes a chamfered portion 48 at its other end so as to allow it to be rotated for the purpose of adjustment. Since a pitch of threads on the lip adjustment bolt 44 is different from a pitch of threads on the lip bolt 47, the adjustment lip 42 is deformed as the lip adjustment bolt 44 is rotated so that a clearance between the adjustment lip 42 and the stationary lip 12b is adjusted as required.

Molten resin extruded from a extruder passes through the manifold 3 and a clearance between the stationary lip 12b and the die casing 13b and then flows through the clearance between the stationary lip 12b and the adjustment lip 42, whereby a product in the form of a film, a sheet or the like having a required thickness is extruded from the clearance between the stationary lip 12b and the adjustment lip 42.

Of course, it is required that not only at the beginning time of an extruding operation, the lip clearance is correctly adjusted by rotating each adjustment bolt so as to extrude a product in the form of a film or the like having a constant thickness but also during an extruding operation, the lip clearance is always monitored so as to assure that a product has a constant thickness. If an adjustment unit is arranged separately for a plurality of die adjustment bolts, not only the whole installation becomes excessively large but also a huge amount of expenditure is required for the installation. In view of the aforementioned fact, usually, a single die adjusting bolt rotating unit is provided for a plurality of die adjustment bolts as disclosed in an official gazette of Japanese Published Patent No. 38249/1980. According to a method disclosed in this prior invention, the die adjustment bolts are successively rotated by actuating the die adjustment bolt rotating unit.

Other typical conventional apparatuses are disclosed in U.S. Pat. No. 3,940,221 titled "Thickness control system for an extrusion die", Japanese Published Patent No. 40537/1986 titled "Apparatus for controlling a slit clearance at an extrusion nozzle" and Japanese Laid-Open Utility Model No. 30128/1988 titled "Thermal displacement type T-shaped die" (corresponding to a technical concept as illustrated in FIGS. 11 to 13).

OBJECTS AND SUMMARY OF THE INVENTION

The conventional apparatus as shown in FIGS. 11 to 13 is constructed such that die bolts (lip adjustment bolts) are indirectly heated by thermally displaceable units (heating units). This construction leads to a property of slow responsiveness to thermal expansion/contraction of the lip adjustment bolts. Further, this conventional apparatus has drawbacks that a wide space is required for receiving each thermally displaceable unit and a distance between the adjacent lip adjustment bolts is widened unavoidably. Another drawback is that in a case where a manual adjusting operation can not be performed in the pushing direction as well as in the pulling direction or an unit for manual adjustment in the pushing direction as well as in the pulling direction is provided for the apparatus, a play appears due to backlash between adjacent threads when pushing is converted in pulling and vice versa. In addition, in a case where the apparatus is operable in the both pushing and pulling direction, when wire disconnection takes place with one heater, the adjustment bolts contract largely, causing an excessively large magnitude of force to exerted on each adjustment bolt. Thus, there arises a danger that the adjustment bolts are broken.

With the conventional apparatus as shown in FIGS. 14 and 15, threadable engagement is made at two locations such that male threads of each lip adjustment bolt 44 are threadably engaged with female threads of the die casing 13b and male threads of each lip bolt 47 are threadably engaged with female threads of the lip adjustment bolt 44. Such threadable engagement causes a play due to back-lash of threads during an adjusting operation for the adjustment lips, when pushing is converted into pulling and vice versa. Therefore, this apparatus has a drawback that fine adjustment can be accomplished only with such difficulties.

Particularly, in a case where the apparatus is constructed such that the adjustment lip is biased in the pushing direction as well as in the pulling direction by utilizing thermal displacement of the lip adjustment bolts 47, it is required that a temperature of each lip bolt 47 is varied excessively. With this construction, there arise other drawbacks in that each heater needs an excessively large capacity and moreover it is difficult to accomplish fine adjustment that is a main object of such die lip adjusting apparatus, due to a delayed adjusting operation and an influence attributable to displacement of adjacent lip bolts in the pushing direction as well as in the pulling direction.

Further, with the conventional method of successively controlling ordinary die adjustment bolts by actuating a single die adjustment bolt rotating unit as disclosed in Japanese Published Patent No. 38249/1980, there arises a problem that a long period of time is required until a predetermined thickness is reached, when a die has an increased width and thereby a number of die adjustment bolts are required as is the case with a T-shaped die for a sheet molding machine and an unextensible film extruding machine. Another problem is that a requirement for a high accuracy of thickness over the whole surface of a sheet or film can not be met satisfactorily.

An object of the present invention is to provide an apparatus for adjusting a plurality of die lips for extrusion molding wherein the aforementioned problems are obviated completely.

To accomplish the above object, there is provided according to a first aspect of the present invention an apparatus for adjusting a plurality of die lips for extrusion molding in the pushing direction as well as in the pulling direction, the die lips being arranged in the direction of width of an extrusion molding die through which molten resin is extruded in the form of a sheet (or a film), wherein the apparatus includes a plurality of stud bolts each of which one end is fastened to a die lip and of which other end is formed with a flange portion for holding Belleville springs, a plurality of Belleville springs received below the flange portion of the stud bolt, a plurality of male-threaded seats each fitted onto the stud bolt and threadably engaged with a die casing to compress the Belleville springs, a plurality of adjustment bolts each having a larger diameter of which inner diameter side is formed with female threads and of which outer diameter side is formed with male threads, a pitch of the female threads being different from a pitch of the male threads, the adjustment bolts being threadably inserted into the die casing from the above, a plurality of adjustment bolts each having a smaller diameter, each of the adjustment bolts being threadably engaged with the female threads of the adjustment bolts having a larger diameter and coming in contact with the uppermost end of the stud bolt, the adjustment bolts being likewise threadably inserted into the die casing from the above, a plurality of nuts each threadably fitted onto the male threads on the outer diameter side of the adjustment bolt having a larger diameter to be firmly held on the die casing via a retainer plate.

Other object of the present invention is to provide an apparatus for adjusting a plurality of die lips for extrusion molding wherein the apparatus as defined above according to the first aspect of the present invention is improved so as to substantially shorten a period of time required for an adjusting operation.

To accomplish the above other object, there is provided according to a second aspect of the present invention an apparatus as defined above according to the first aspect of the present invention, wherein the apparatus further includes a plurality of cylindrical heaters each fitted onto the stud bolt to directly heat it, a layer of thermal insulating material interposed between the heaters and the die casing while maintaining a fine clearance between the layer of thermal insulating material and the heaters, a cooling jacket firmly secured to the die casing while maintaining a fine clearance between the cooling jacket and the heaters, the cooling jacket being located outside of the heaters, the fine clearance being communicated with the fine clearance between the layer of thermal insulating material and the heaters, and a plurality of cooling air passages communicated with the fine clearance between the cooling jacket and the heaters so as to allow cooling air to reach each heater through cooling passage.

Another object of the present invention is to provide an apparatus for adjusting a plurality of die lips for extrusion molding wherein the apparatus as defined above according to the first aspect of the present invention is improved such that each die adjustment bolt is designed in the form of a differential screw so that each lip clearance can quickly and accurately be adjusted by actuating a single bolt rotating unit.

To accomplish the above another object, there is provided according to a third aspect of the present invention an apparatus as defined above according to the first aspect of the present invention, wherein the upper portion of the adjustment bolt having a larger diameter is contoured such that a chuck of the bolt rotating unit can correctly be engaged with the upper portion of the adjustment bolt having a larger diameter, the bolt rotating unit being arranged separately from the apparatus.

Other objects, features and advantages of the present invention will be readily apparent from reading of the following description which has been made with reference to the accompanying drawings.

BRIEF DESCRIPTION OF THE DRAWINGS

The present invention is illustrated in the following drawings in which.

DETAILED DESCRIPTION OF THE PREFERRED EMBODIMENTS

Now, the present invention will be described in detail hereinafter with reference to the accompanying drawings which illustrate several preferred embodiments thereof.

First, description will be made below as to an apparatus for adjusting a plurality of die lips for extrusion molding in accordance with a first embodiment of the present invention with reference to FIGS. 1 and 2.

Figures 1, 2:
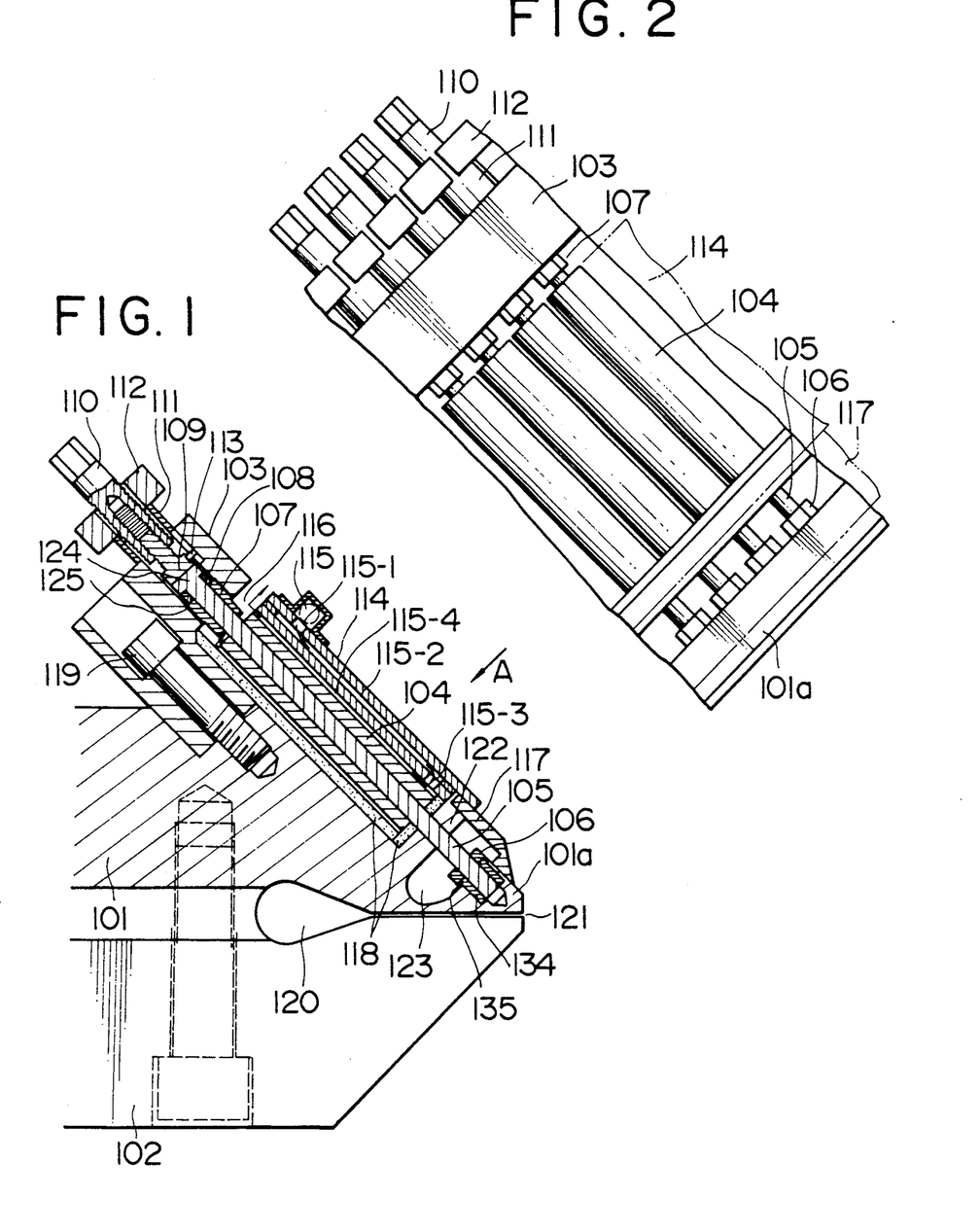
FIG. 1 is a sectional side view of an apparatus for adjusting a plurality of die lips for extrusion molding in accordance with a first embodiment of the present invention.
FIG. 2 is a view of the apparatus a seen in the A arrow-marked direction in FIG. 1.

Referring to FIG. 1, a resin flowing passage 120 is formed by combining a die casing 101 with a die casing 102, and a resin discharging port 121 is formed between a flexible lip 101a at the foremost end of the die casing 101 and the foremost end part of the die casing 102. A holding block 103 for holding a plurality of adjusting bolts is fixedly secured to the die casing 101 in a region outside of the die casing 101 by tightening a plurality of bolts 119. Here, it should be noted that the apparatus is in practice provided with a plurality of flexible lips 101a in the direction of width of the die casing 102 but only one of them is herein shown for the purpose of simplification of illustration and that other associated components are shown in the same way in the drawings.

In addition, a plurality of stud bolts 105 are threadably engaged with the surface of the die casing 101 opposite to the surface of the resin flowing passage of the flexible lip 101a at the foremost end of the die casing 101 via thermal insulating materials 134 (in the form of screw parts made of ceramic material or helical inserts made of stainless steel) so that they are kept fixed by lock nuts 106 via thermal insulating plates 135. Each stud bolt 105 is formed with a flange portion 124 at its opposite end to hold Belleville springs 108, and the opposite end of the stud bolt 105 is inserted in a female-threaded hole 125 in the holding block 103. The Belleville springs 108 are received below the flange portion 124 and a male-threaded seat 107 is threadably fitted into the female-threaded hole 125 in the holding block 103 so as to impart a compressive force to the Belleville springs 108.

An adjustment bolt 110 having a larger diameter is disposed at the outside part of the holding block 103 and another adjustment bolt 109 having a smaller diameter is threadably fitted into inner female threads of the adjustment bolt 110. A fixing nut 111 is threadably fitted onto outer male threads of the adjustment bolt 110 (of which the pitch is different from that of the respective inner female threads). The fixing nut 111 is firmly held on the holding block 103 by bolts (not shown) via a retainer plate 112. As is apparent from FIG. 2, the retainer plate 112 is divided into a plurality of retainer members each of which is bridged between the adjacent fixing nuts 111. The adjustment bolts 109 and 110 and the fixing nut 111 are assembled together, the adjustment bolt 109 is firmly held on the holding block 103 so as not to rotate thereon, by fitting a rotation inhibitive pin 113 to the adjustment bolt 109 and moreover the fixing nut 111 is firmly held on the holding block 103 so as not to rotate thereon, whereby a differential screw type adjustment bolt is provided. This arrangement allows manual adjustment to be achieved by finely adjusting the foremost end of the adjustment bolt 109 by rotating the adjustment bolt 110 after the Belleville springs 108 are kept free by loosening the male-threaded seat 107 relative to the holding block 103 and then tightening the male-threaded seat 107 to impart a required intensity of compressive force to the Belleville springs 108 after finely adjusting the position assumed by the foremost end of the stud bolt 105.

To heat the stud bolt 105, a heater 104 is provided. The heater 104 is fabricated in the form of an elongated sleeve of which inner diameter is accurately machined so as to allow it to be fitted onto the stud bolt 105. A thermal insulating material 118 is interposed between the heater 104 and the die casing 101 to minimize heat conduction therebetween.

In the drawing, reference numeral 117 designates a thermal insulating plate. The thermal insulating plate 117 serves to prevent heat from being irradiated from the stud bolt 105 and other components by filling a hollow space 123 between the flexible lip 101a and the flange portion 122 of the die casing 101 with the thermal insulating plate 117. Reference numeral 114 designates an intake/exhaust jacket. The intake/exhaust jacket 114 is formed with air passages for cooling the heater 104 which heats the stud bolt 105. In addition, the jacket 114 serves to insulate the heater 104 from the outside air. The jacket 114 extends across the full width of the die, and to feed air over the whole area of the jacket 114, air is introduced via an inlet port 115 and a plurality of holes 115-1, flows through air passages 115-2 and lower air passages 115-3 to reach the outer surface of the heater 104, further flows through air passages 115-4 while cooling the heater 104 and finally is discharged to the outside via exhaust ports 116. Cooling of the heater 104 in this manner causes the stud bolt 105 to be cooled.

Next, operation of the apparatus as constructed in the above-described manner will be described below.

Since the stud bolt 105 is separated from the adjustment bolts 109 and 110, the adjustment bolt assembly operates such that a force generated by a number of threads in the pulling direction is not imparted to the stud bolt 105 but a resilient force given by the Belleville spring 108 in the pulling direction is applied to it. Thus, as the adjustment bolts 109 and 110 are rotated in the loosening direction, a force generated by the Belleville spring 108 in the pulling direction is imparted to the stud bolt 105. Since an intensity of resilient force given by the Belleville springs 108 and a quantity of adjustment of the stud bolt 105 can adequately be adjusted by increasing or decreasing the number of Belleville springs 108 arranged in parallel with each other and the number of Belleville springs 108 arranged in series, it suffices that a required number of Belleville springs are selected and arranged adequately (FIG. 1 shows a case where two sets of two superposed Belleville springs are arranged in serial combination).

In a case where automatic adjustment is carried out by heating or cooling the stud bolt 105, when the stud bolt 105 is heated to expand, the uppermost end of the stud bolt 105 is depressed by the adjustment bolt 109, causing the expansion of the stud bolt 105 to be converted into a force effective for biasing the flexible lip 101a in the pushing direction. On the other hand, when the stud bolt 105 is cooled to contract, the uppermost end of the stud bolt 105 is displaced away from the adjustment bolt 109 but a force effective for biasing the flexible lip 101a in the pulling direction is exerted on the stud bolt 105, because an upward force is imparted to it under the effect of resilient force of the Belleville springs 108. Therefore, the flexible lip 101a can be biased in the pushing direction as well as in the pulling direction. It should be noted that since a certain force is always exerted on the adjustment bolts 109 and 110 in the same direction by the Belleville springs 108, no play appears on threads when pushing is converted into pulling and vice versa.

In addition, since the stud bolt 105 is separated from the adjustment bolts 109 and 110 via threads, an excessive amount of contraction of the stud bolt 105 caused due to wire disconnection in a single heater can be absorbed by an ample quantity of deflection of the Belleville springs 108, whereby an extra force in excess of the reactive force of the Belleville springs 108 is not exerted on the stud bolt 105. This assures that a serious problem arising in a case where the flexible lip 101a is biased in the pushing direction as well as in the pulling, i.e., a problem of breakage of the stud bolt 105 in the event of wire disconnection in a certain heater can be obviated. Further, since the retainer plate 112 for retaining the fixing nuts 111 are divided into a plurality of retainer members each of which is bridged between the adjacent fixing nuts 111, it is required that only one retainer member is replaced with new one when a malfunction takes place with the adjustment bolt 109 and 110 or the heater 104.

The present invention has been described above with respect to the case where the apparatus is provided with the heater 104. It should of course be understood that the present invention should not be limited only to this but it may be applied to a case where the clearance at the flexible lip 101a is manually adjusted as required with the heater 104, the thermal insulating plate 118 and the intake/exhaust jacket 114 removed therefrom.

Figures 3, 4:
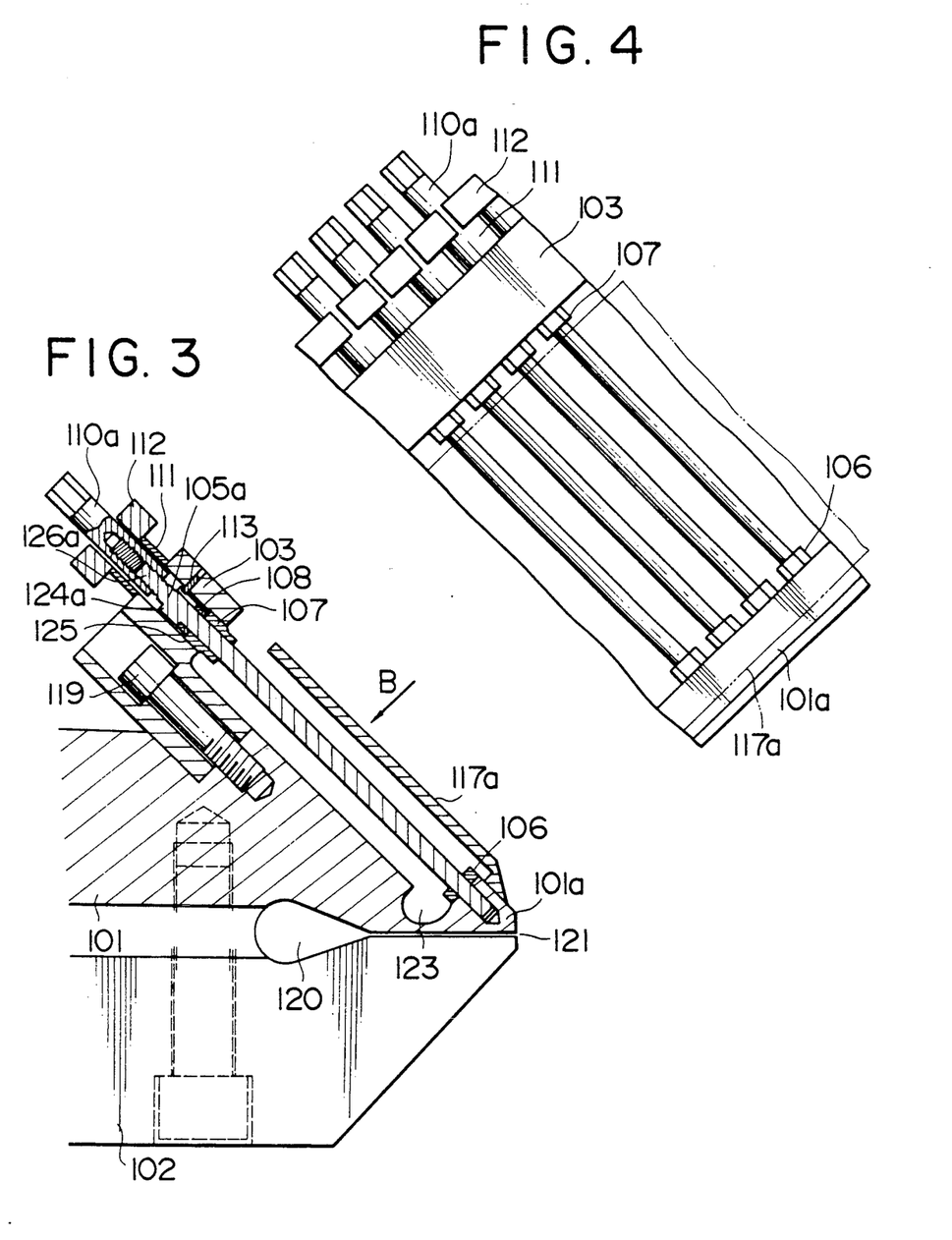
FIG. 3 is a sectional side view of an apparatus for adjusting a plurality of die lips for extrusion molding in accordance with a second embodiment of the present invention.
FIG. 4 is a view of the apparatus as seen in the B arrow-marked direction in FIG. 3.

FIGS. 3 and 4 show an apparatus for adjusting a plurality of die lips for extrusion molding in accordance with other embodiment of the present invention. For the purpose of simplification of illustration, a heater, an intake/exhaust jacket, a thermal insulating plate and others as mentioned above in connection with the preceding embodiment are removed from the apparatus.

A significant feature of the apparatus in accordance with this embodiment consists in that an adjustment bolt having a smaller diameter is integrated with a stud bolt and the resultant assembly is threadably engaged with an adjustment bolt having a larger diameter, and other structure rather than the foregoing one is same to that in the preceding embodiment.

Specifically, a stud bolt 105a includes a flange portion 124a of which fore part is formed with a male-threaded part 126a which in turn is threadably fitted into an adjustment bolt 110a. In the drawings, reference numeral 117a designates a cover for thermal insulation. Same components as those in the preceding embodiment are represented by same reference numerals.

Figure 5:
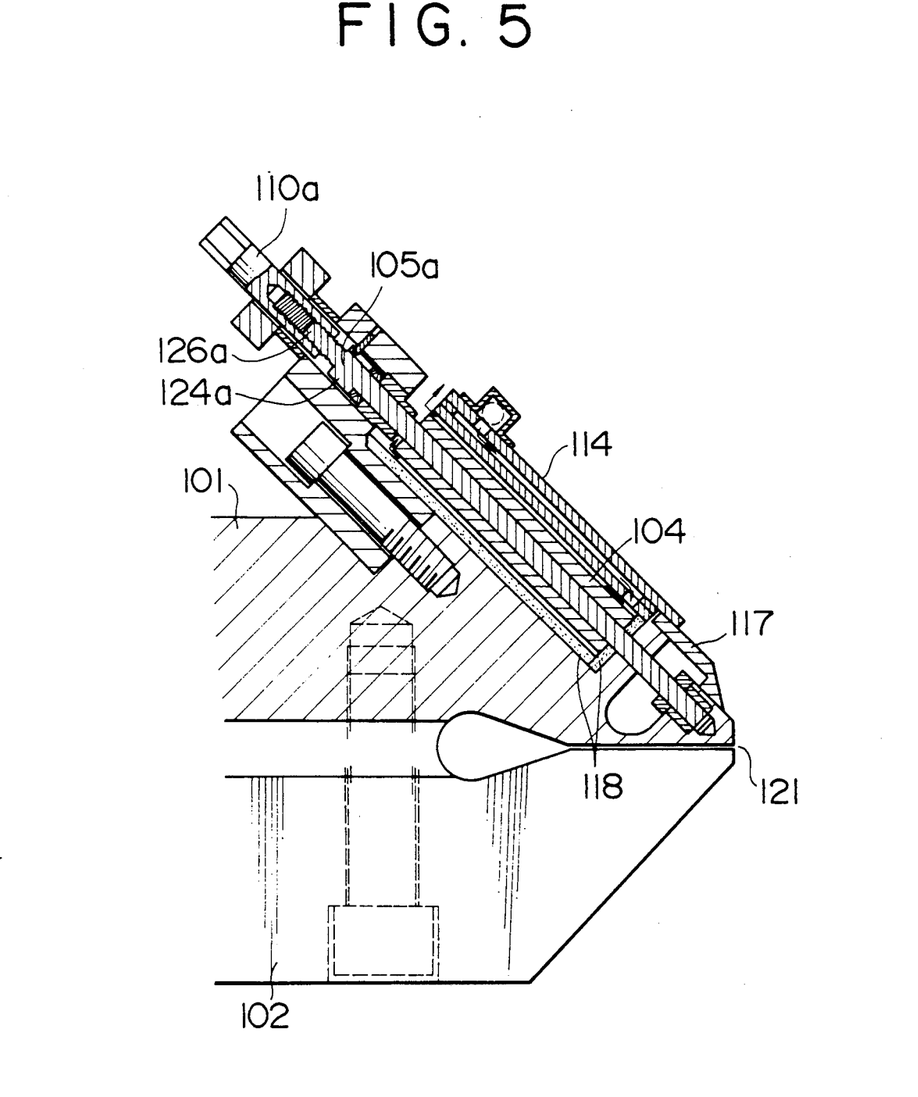
FIG. 5 is a sectional side view of an apparatus for adjusting a plurality of die lips for extrusion molding in accordance with a third embodiment of the present invention.

FIG. 5 is a sectional view which illustrates a case where the embodiment as shown in FIG. 3 and 4 is applied to the embodiment in FIGS. 1 and 2.

Operation of the apparatus and advantageous effects derived from the apparatus are same to those of the preceding embodiments.

Figure 6:
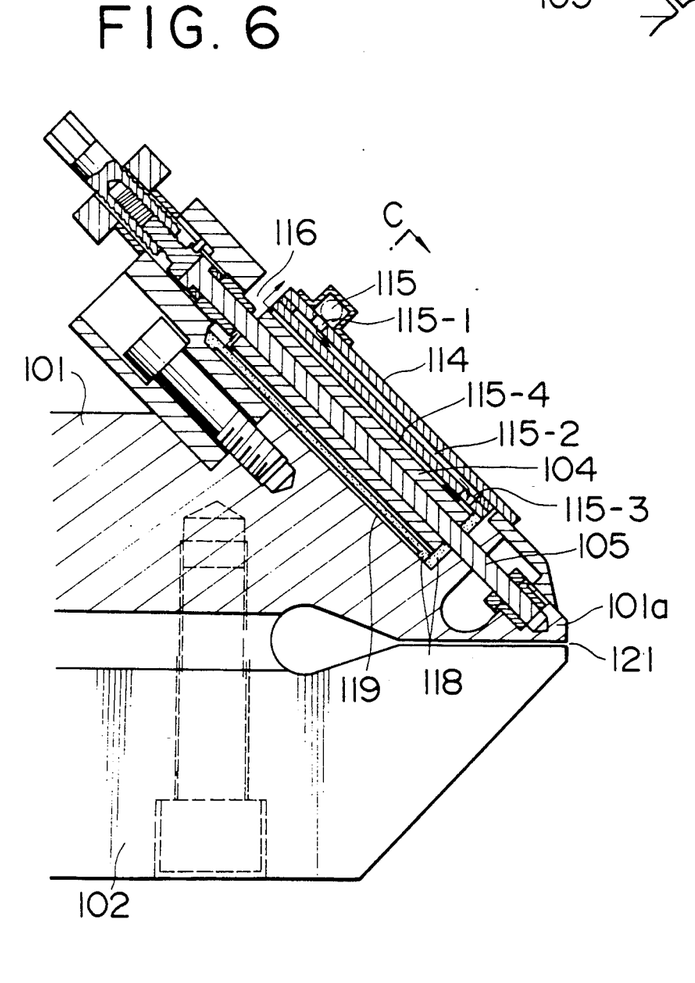
FIG. 6 is a sectional side view of an apparatus for adjusting a plurality of die lips for extrusion molding in accordance with a fourth embodiment of the present invention.
Figure 7:
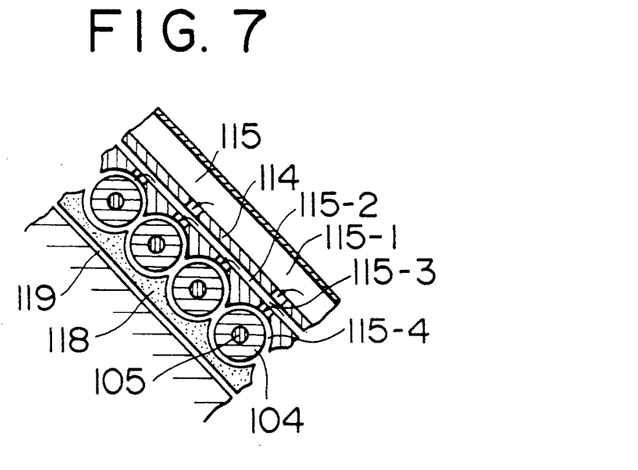
FIG. 7 is a fragmentary sectional view of the apparatus taken in a plane identified by an arrow mark C in FIG. 6.

FIGS. 6 and 7 show an apparatus for adjusting a plurality of die lips for extrusion molding in accordance with another embodiment of the present invention.

This embodiment is modified from the embodiments shown in FIGS. 1, 2 and 5 and the apparatus has the substantially same structure as that of the preceding embodiments with the exception of components which will be described below. Accordingly, same components as those in the preceding embodiment are represented by same reference numerals.

As shown in FIGS. 6 and 7, the apparatus is constructed such that a plurality of cylindrical heaters 104 each having a stud bolt 105 firmly inserted therein are arranged one after another in the direction of width of the die casing 101 and annular air passages 115-4 and a clearance 119 are formed between the heaters 104 and the die casing 101 with a thermal insulating material 118 interposed therebetween. An exhaust jacket 114 is attached to the die casing 101 across the full width thereof on the outer side of each heater 104 with a fine clearance serving as an air passage 115-4 kept therebetween. The exhaust jacket 114 is formed with an air intake port 115 extending across the full width of the die casing 101. As air is introduced into the exhaust jacket 114 through the air intake port 115, it flows through the annular air passages 115-4 round the outer surface of each heater 104 via air passages 115-1 to 115-3 and finally it is discharged to the outside via exhaust ports 116. It should be noted that the air passages between the outer surfaces of the respective heaters 104 in the exhaust jacket 114 and the thermal insulating material 118 are communicated with the air exhaust port 116.

According to this embodiment, a clearance of the air passage 115-4 round each heater 104 is minimized as far as possible and the air passages 115-3 are oriented toward the heaters 104 to assure that cooling air in the exhaust jacket 114 reaches the respective air heaters 104.

Next, operation of the apparatus will be described below. However, since description has been made as to the respect that the both adjustment bolts are manually actuated and the flexible lip is biased in the pushing direction as well as in the pulling direction to adjust a size of the clearance, repeated description on the foregoing respect is eliminated for the purpose of simplification. Accordingly, description will be made hereinafter while taking into account mainly expansion and contraction of the stud bolt 105 caused by heating and cooling of the same.

As the stud bolt 105 is heated, it linearly expands by thermal expansion so that the flexible lip 101a is biased in the pushing direction to reduce the lip clearance of the resin discharge port 121. To the contrary, when the stud bolt 105 is cooled, it contracts linearly to bias the flexible lip 101a in the pulling direction corresponding to a quantity of the displacement of the stud bolt 105, whereby the lip clearance of the resin discharge port 121 is enlarged.

Automatic adjusting operation for the flexible lip 101a is performed based on the above-described behavior of the stud bolt 105.

In this connection, it has been confirmed by the inventors that a period of time required for the automatic adjusting operation depends on a cooling speed of each stud bolt 105.

Namely, a period of time required for adjusting the lip clearance can be shortened as the stud bolt 105 is cooled more and more quickly.

In view of the aforementioned fact, according to this embodiment, to enhance a capability of cooling the outer surface of each cylindrical heater 104 in which the stud bolt 105 is fitted, the clearance constituting the air passage 115-4 round each heater 104 is minimized as far as possible to increase the speed of cooling air flowing along the outer surface of the heater 104 and moreover cooling air flowing from the jacket 114 collides against each heater 104 without fail through the air passages 115-3 which are oriented toward the heaters 104.

Additionally, the thermal insulating material 118 is interposed between the die casing 101 and the heaters 104 to shut heat conduction from the die casing 101 to the heater 104 so that heat conduction from the die casing 101 is minimized during an operation for adjusting the lip clearance. Particularly, an air layer (a clearance 119) is provided between the thermal insulating material 118 and the die casing 101 to completely obviate the influence attributable to heat conduction from the die casing 101 during cooling of the stud bolt 105.

Figures 8, 9:
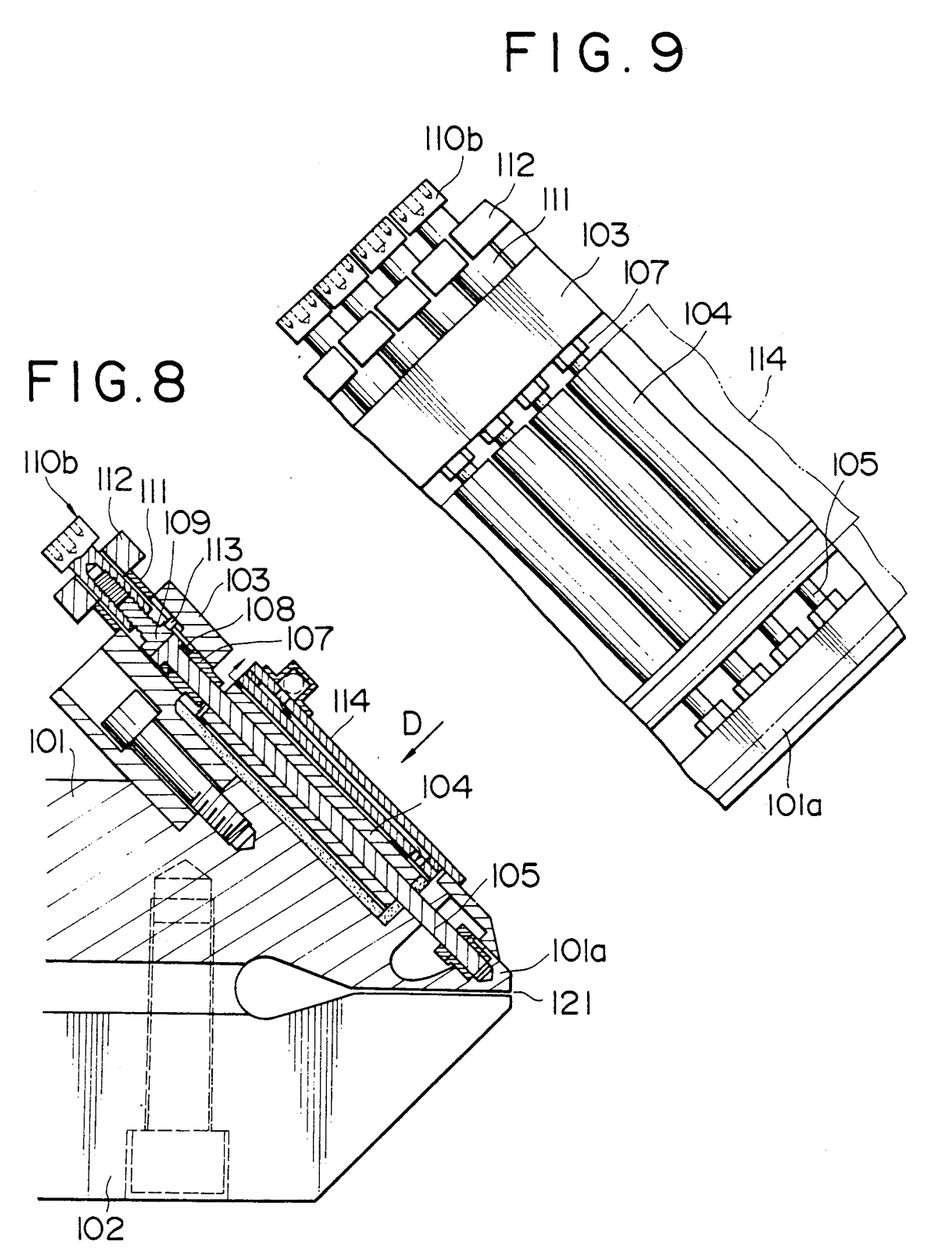
FIG. 8 is a sectional side view of an apparatus for adjusting a plurality of die lips for extrusion molding in accordance with a fifth embodiment of the present invention.
FIG. 9 is a view of the apparatus as seen in the D arrow-marked direction in FIG. 8.
Figure 10:
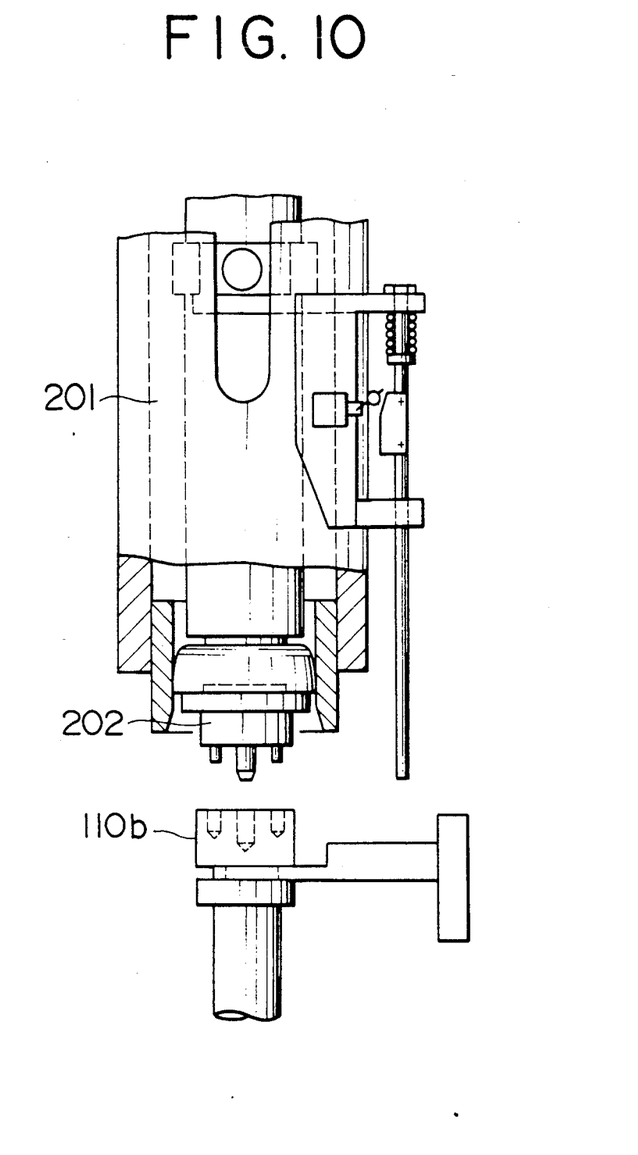
FIG. 10 is an explanatory view which schematically illustrates the structure of an unit for rotating die adjustment bolts.

FIGS. 8 to 10 show an apparatus for adjusting a plurality of die lips for extrusion molding in accordance with another embodiment of the present invention. The structure shown in FIGS. 8 and 9 is same as that in the embodiment in FIGS. 1 and 2 with the exception of the head portion of an adjustment bolt at the uppermost end of a stud bolt. Accordingly, same components as those in the embodiment in FIGS. 1 and 2 are represented by same reference numerals.

An adjustment bolt 110b having a larger diameter is threadably engaged with the outside part of a holding block 103 and an adjustment bolt 109 having a smaller diameter is threadably fitted into an inner female-threaded hole of the adjustment bolt 110b. The head portion of the adjustment bolt 110b is contoured such that a chuck 202 of a die adjustment bolt rotating unit 201 (see FIG. 10) can correctly be placed on the adjustment bolt 110b. Further, a fixing nut 111 is threadably fitted onto a male-threaded part of the adjustment bolt 110b (of which pitch is different from that of a female-threaded part of the same). The fixing nut 111 is firmly held on the holding block 103 by bolts (not shown) via a retainer plate 112. It should be added that the retainer plate 112 is likewise divided into a plurality of retainer members each of which is bridged between the adjacent fixing nuts 111.

The rotating unit 201 ca move in the direction of width of the die casing 101 and the chuck 202 can be attached to and detached from the end portion of the adjustment bolt 110b.

With the structure as described above, the both adjustment bolts 109 and 110b and the fixing nuts 111 are assembled together, the adjustment bolt 109 is firmly held on the holding block 103 so as not to rotate thereon, by fitting a rotation inhibitive pin 113 to the adjustment bolt 109 and moreover the fixing nut 111 is firmly held on the holding block 103 so as not to rotate thereon, whereby a differential screw type adjusting bolt is provided. This arrangement allows manual adjustment to be achieved by finely adjusting the foremost end of the adjustment bolt 109 by rotating the adjustment bolt 110b after the Belleville springs 108 are kept free by loosening the male-threaded seat 107 relative to the holding block 103 and then tightening the male-threaded seat 107 to impart a required intensity of compressive force to the Belleville springs 108 after adjusting the position assumed by the foremost end of the stud bolt 105. At this time, rotation of the adjustment bolts 110b arranged in the direction of width of the die is accomplished while displacing the bolt rotating unit 201 shown in FIG. 10.

According to the present invention, since a large quantity of displacement of the flexible lip 101a caused by heating the heaters 104 can not be obtained, rough adjustment is automatically carried out for setting a degree of opening of the die lip 121 and creating a pattern of the die lip 121, by rotating the adjustment bolts 110b with the bolt rotating unit 201 as described above.

Specifically, when the kind of resin to be extrusion molded is to be changed or the color of resin to be extruded is to be changed to another one, a thickness of sheet coming from a casting machine (not shown) is first measured using a thickness meter (e.g., a BETA ray type thickness meter which is not shown in the drawings) and then data on the thickness derived from the measurement are transmitted to a control unit (not shown) appended to the rotating unit 201. The control unit selects a predetermined adjustment bolt 110b in such a manner that the sectional pattern of a sheet at the outlet of the casting machine assumes a pattern corresponding to a product such as an unextensible film, a two axes extensible film or the like (e.g. □ for the unextensible film and □ for the two axes extensible film). Then, the rotation unit 201 is displaced in the direction of width of the die casing so that the relevant adjustment bolt 110b is rotated by a predetermined angle to set a degree of opening of the die lip 121. The foregoing operations are automatically performed one after another to accomplish rough adjustment.

Next, the stud bolts 105 are finely adjusted by activating the heaters 104.

As described in detail above, according to one aspect of the present invention, one end of a stud bolt is fastened to a die lip and the other end of the same comes in contact with an adjustment bolt having a smaller diameter threadably engaged with inner female threads of another adjustment bolt having a larger diameter which can be displaced in the pushing direction as well as in the pulling direction. This arrangement enables the die lip to be finely adjusted with high accuracy and easiness by a manual operation. Since the both adjustment bolts are separated from the stud bolt, a force given by the adjustment bolts in the pulling direction is not exerted on the stud bolt but a resilient force given by Belleville springs in the pulling direction is imparted to it. Consequently, as the adjustment bolts are rotated in the loosening direction, a force effective in the pulling direction is exerted on the stud bolt by the Belleville springs. In addition, since a force is always exerted on the adjustment bolts in the same direction by the Belleville springs, a play does not appear on threads of the adjustment bolts when pushing is shifted to pulling and vice versa.

When arrangement is made such that a stud bolt is inserted into a heater while extending along the center axis therethrough, a period of time required for cooling can be shortened. Further, when an arrangement is made such that air is introduced directly into the outer surface of each heater to cool it, a property of responsiveness to thermal expansion and contraction of each stud bolt, i.e., a property of responsiveness to adjustable displacement of a flexible lip in the pushing direction as well as in the pulling can be improved. In a case where each stud bolt is automatically adjusted by heating and cooling, when the stud bolt is heated to expand, expansion of the stud bolt is converted into a force for biasing the die lip in the pushing direction, since the uppermost end of the stud bolt is depressed by an adjustment bolt having a smaller diameter. As the stud bolt is cooled to contract, the uppermost end of the stud bolt is displaced away from the adjustment bolt having a smaller diameter but, since an upward biasing force is exerted on the stud bolt under the effect of resilient force of Belleville springs, the die lip is biased by the upward biasing force in the pulling direction. Consequently, the die lip can be displaced in the both pushing and pulling directions. Further, even if stud bolts contract largely due to wire disconnection in one heater among a plurality of heaters, contractive displacement of the stud bolts is absorbed by an ample quantity of flection of Belleville springs, whereby a force in excess of the reactive force of the Belleville springs is not exerted on the stud bolts. Thus, a serious problem arising in a case where the die lip is biased in the pushing direction as well as in the pulling direction, i.e., a problem of breakage of the stud bolts in the event of wire disconnection in heaters can be obviated. If a retainer plate for retaining fixing nuts is divided into a plurality of retainer members each of which is bridged between the adjacent fixing nuts, it suffices that only one retainer member is replaced with new one when a malfunction takes place with adjustment bolts or heaters.

Additionally, if the adjustment bolt having a smaller diameter is integrated with the stud bolt, the apparatus can be constructed more simply.

According to other aspect of the present invention, since the stud bolts for adjustably displacing the die lip are heated directly by cylindrical heaters, a heating speed, i.e., a speed of expansive displacement of the stud bolts can substantially be increased compared with the aforementioned conventional apparatus for adjusting a plurality of die lips for extrusion molding in accordance with a thermal displacement system.

According to another aspect of the present invention, since arrangement is made such that a cooling air flows along the outer surface of each heater at a high speed during a cooling operation for stud bolts and the thermal influence attributable to heat transmission from the die casing is completely shut off by a combination of thermal insulating material and air layer, a cooling speed of cylindrical heaters, i.e., a cooling speed of the stud bolts can be increased and a speed of contractive displacement of the stud bolts can be increased. As a result, a speed of response to an adjustable displacement of the die lip can be increased and a period of time required for adjustment of the die lip can be shortened further.

According to another aspect of the present invention, since an arrangement is made such that one end of a stud bolt is fastened to the die lip and the other end of the same comes in contact with an adjustment bolt having a smaller diameter threadably engaged with female threads on the inner diameter side of an adjustment bolt having a larger diameter and moreover an arrangement is made such that a chuck of a die adjustment bolt rotating unit can correctly be placed on the upper portion of the adjustment bolt having a larger diameter, rough adjustment of the die lip can accurately and quickly be accomplished by successively rotating adjustment bolts each having a larger diameter located at required positions by actuating a single die adjustment bolt rotating unit.

While the present invention has been described above with respect to several preferred embodiments thereof but it should of course be understood that it should not be limited only to them but various changes or modifications may be made in an optimum manner without departure from the scope of the present invention as defined by the appended claims.

What is claimed is:

1. In an apparatus for controlling a plurality of die lips for extrusion molding in the pushing direction as well as in the pulling direction, said die lips being arranged in the direction of width of an extrusion molding die through which molten resin is extruded in the form of a sheet or a film, the improvement comprising;
    a plurality of stud bolts each of which has one end fastened to one of said die lips and the other end formed with a flange portion for holding Belleville springs,
    a plurality of Belleville springs received below said flange portion of said stud bolt,
    a plurality of male-threaded seats each fitted on said stud bolt and threadably engaged with a die casing to compress said Belleville springs,
    a plurality of adjustment bolts each having a larger diameter of which inner diameter side is formed with female threads and of which outer diameter side is formed with male threads, a pitch of said female threads being different from a pitch of said male threads, said adjustment bolts being threadably inserted into said die casing from above,
    a plurality of other adjustment bolts each having a smaller diameter, each of said other adjustment bolts being threadably engaged with the female threads of the adjustment bolt having a larger diameter and coming in contact with the uppermost end of the stud bolt, said other adjustment bolts being likewise threadably inserted into the die casing from above, and
    a plurality of nuts each threadably fitted onto said male threads on the outer diameter side of the adjustment bolt having a larger diameter to be firmly held on said die casing via a retainer plate.

2. The apparatus as claimed in claim 1, wherein the other adjustment bolt having a smaller diameter with which the uppermost end of the stud bolt comes in contact is integrated with the stud bolt.

3. The apparatus as claimed in claim 1 further including a plurality of cylindrical heaters each fitted onto the stud bolt to directly heat it, a layer of thermal insulating material interposed between said heaters and the die casing while maintaining a fine clearance between said layer of thermal insulating material and said heaters, a cooling jacket firmly secured to the die casing while maintaining another fine clearance between said cooling jacket and said heaters, said cooling jacket being located outside of said heaters, said another fine clearance being communicated with said fine clearance between the layer of thermal insulating material and the heaters, and a plurality of cooling air passages communicated with the fine clearance between the cooling jacket and the heaters so as to allow cooling air to reach each heater through said cooling air passage.

4. The apparatus as claimed in claim 1, wherein an upper portion of each of said adjustment bolts having a larger diameter is contoured for engaging a chuck of a bolt rotating unit with the upper portion of the adjustment bolt having a larger diameter, said bolt rotating unit being arranged separately from the apparatus.

* * * * *